United States Patent
Ladru et al.

(10) Patent No.: US 8,158,906 B2
(45) Date of Patent: Apr. 17, 2012

(54) WELDING METHOD AND WELDING DEVICE

(75) Inventors: Francis-Jurjen Ladru, Berlin (DE); Gerhard Reich, Berlin (DE); Helge Reymann, Briarcliff Manor, NY (US)

(73) Assignee: Siemens Aktiengesellschaft, Munich (DE)

( * ) Notice: Subject to any disclaimer, the term of this patent is extended or adjusted under 35 U.S.C. 154(b) by 972 days.

(21) Appl. No.: 12/086,798

(22) PCT Filed: Nov. 30, 2006

(86) PCT No.: PCT/EP2006/069157
§ 371 (c)(1),
(2), (4) Date: Jun. 19, 2008

(87) PCT Pub. No.: WO2007/071537
PCT Pub. Date: Jun. 28, 2007

(65) Prior Publication Data
US 2009/0001065 A1    Jan. 1, 2009

(30) Foreign Application Priority Data
Dec. 19, 2005 (EP) .................................. 05027790

(51) Int. Cl.
*B23K 9/04* (2006.01)
(52) U.S. Cl. ...... 219/137 R; 219/137 WM; 219/121.13; 219/121.14; 219/121.45; 219/121.46; 219/121.63; 219/121.64; 219/76.16
(58) Field of Classification Search ................... None
See application file for complete search history.

(56) References Cited

U.S. PATENT DOCUMENTS

| 3,073,948 | A |   | 1/1963  | Johnson |              |
|-----------|---|---|---------|---------|--------------|
| 3,493,713 | A |   | 2/1970  | Johnson |              |
| 3,922,519 | A | * | 11/1975 | Miyano et al. | 219/73.11 |
| 6,049,060 | A | * | 4/2000  | Smashey et al. | 219/137 R |

FOREIGN PATENT DOCUMENTS

| BE | 672557    | 5/1966 |
| EP | 0 013 348 | 4/1979 |

* cited by examiner

Primary Examiner — Joseph M Pelham

(57) ABSTRACT

Conventional welding methods have the disadvantage of producing worse welded joints at the beginning of the process than in the later course of the method. The method in question uses an initializing plate on which the welding process is begun and then once a consistent quality can be achieved for the welded joint continues onto the points for repair.

9 Claims, 5 Drawing Sheets

WELDING METHOD AND WELDING DEVICE

CROSS REFERENCE TO RELATED APPLICATIONS

This application is the US National Stage of International Application No. PCT/EP2006/069157, filed Nov. 30, 2006 and claims the benefit thereof. The International Application claims the benefits of European application No. 05027790.4 filed Dec. 19, 2005, both of the applications are incorporated by reference herein in their entirety.

FIELD OF INVENTION

The invention relates to a welding method and to a welding device as claimed in the claims.

BACKGROUND OF THE INVENTION

In a welding method the substrate of a component is melted so that cracks in the substrate are sealed, optionally with the addition of an auxiliary welding material, particularly in the form of powder, which is also melted and allowed to solidify during the welding.

Particularly for directionally solidified components, which have a longitudinally directed grain structure or consist of a single crystal, such welding methods are also used in order to set up a directionally solidified structure in the welded region.

The problem with the welding method, however, is that the process does not already take place stably from the start, so that the sites which are welded first often have inferior properties compared with the other welded regions and they often have to be melted once more.

SUMMARY OF INVENTION

It is therefore an object of the invention to overcome the aforementioned problem.

The object is achieved by a welding method as claimed in the claims and a welding device as claimed in the claims.

The measures listed in the dependent claims may be combined with one another in any desired way, in order to achieve further advantages.

Here, according to the invention, the method start point of the welding method thus lies on the precursor plate, so that the welding process is stable when the cavity start point is reached and high-quality uniform properties of the entire welded region are achieved from the start.

BRIEF DESCRIPTION OF THE DRAWINGS

Exemplary embodiments of the invention will be explained in more detail below with reference to the drawings, in which.

DETAILED DESCRIPTION OF INVENTION

Figure 1:
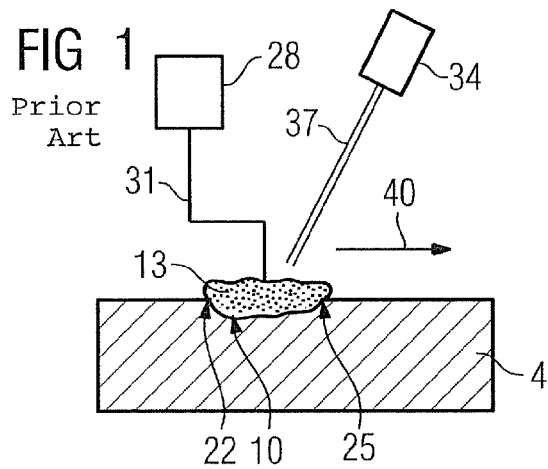
FIG. 1 shows a welding device according to the prior art.

FIG. 1 shows a welding device according to the prior art. An auxiliary welding material 13 is supplied to a site 10 to be repaired in a substrate 4 via a powder feed 31 from a powder reservoir 28, which 13 is melted by means of a heat source 34, in particular by an electron beam gun, a laser 34 or by plasma welding, and allowed to solidify. Either the substrate 4 or the powder feed 31, or the beams 37 from the heat source 34 travel in a welding direction 40, in which 40 for example an elongate crack 10 or a cavity 10 propagates as a site 10 to be repaired. The method begins at a start point 22 of the cavity 10 and an end point 25 of the site 10 to be repaired.

Figure 2:
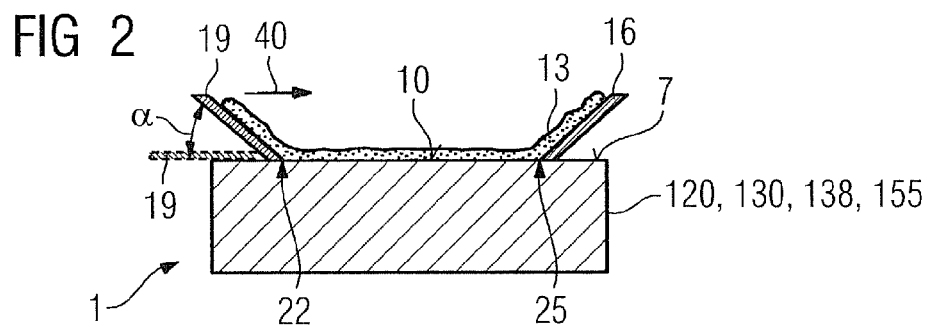
FIG. 2 shows a device according to the invention.

FIG. 2 shows a device 1 according to the invention, with which the welding method according to the invention can be carried out.

The substrate 4 of a component 120, 130, 138, 155 has a surface 7, a subregion of which, i.e. the site 10 to be repaired, is intended to be welded. This may be a crack 10 or a cavity 10 (discussed below by way of example) which needs to be filled.

Material may likewise be applied over a large area in order to achieve thickening of a wall, particularly in the case of hollow components 120, 130.

The auxiliary welding material 13 is used for this, which fills the crack 10 or the cavity 10, or thickens the surface 10.

The auxiliary welding material 13 may be supplied constantly in the form of powder during the welding, or it may have been introduced into the cavity 10 in the form of a strip or wire.

According to the invention, the welding method does not begin at the start point 22 of the site 10 to be repaired, beyond which the supply or presence of the auxiliary welding material 13 would be necessary, but instead previously on a separate precursor plate 19 which either rests fully on the surface 7 (indicated by dashes) or bears on the surface 7 with a particular angle α at the start point 22.

"Separate" means that the precursor plate 19 is not part of the component 120, 130, 138, 155 or of a welded region 14.

There may be a gap between the precursor plate 19 and the surface 7.

Here, according to the invention, the method start point 43 of the welding method thus lies on the precursor plate 19 so that the welding process is stable when the cavity start point 22 is reached, and high-quality uniform properties of the entire welded region are achieved from the start.

There may likewise be a separate follower plate 16 at the end point 25, although there does not have to be one, which bears on the end point 25, the follower plate 16 likewise being provided with the auxiliary welding material 13 and the method being concluded at the method end point 46.

A homogeneous structure of the welded region 14 is thus achieved throughout the site 10 to be repaired.

Figure 3:
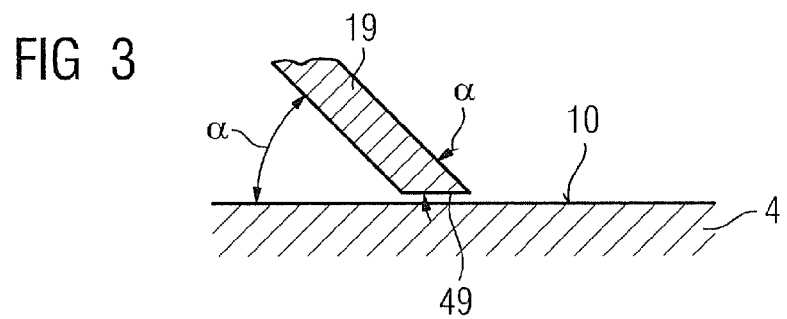
FIGS. 3, 4 show special components of the welding device according to the invention.

The precursor or follower plate 16, 19, which are preferably designed in the form of plates, bears on the surface 10 of the substrate 4 so that as far as possible no gap, or preferably only a small gap, is formed between the surface 10 and an edge, i.e. the contact surface 49 of the precursor plate 16 or follower plate 19 (FIG. 3), i.e. the front edge of the precursor plate 16 is configured obliquely.

Figure 4:
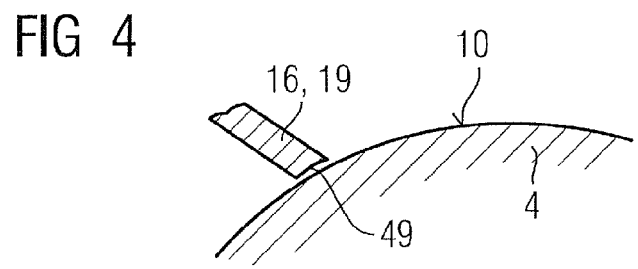

Optionally, the touching surfaces 49 of the plates 16, 19 are curved like a curved surface 10 of a component 4, as is the case for example with turbine blades 120, 130 (FIG. 4).

FIG. 4 shows the conduct of the welding method according to the invention.

A precursor plate 19 is used, on which the welding method is started at a method end point 43.

At least at the start point 22, the welding method takes place stably (FIG. 4a). The distance between the method start point 43 and the start point 22 is preferably 2 mm-10 mm.

Figure 5A:
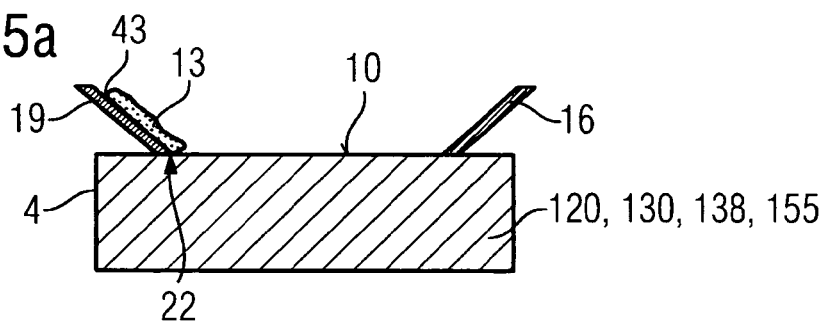
FIG. 5 shows the conduct of the welding method according to the invention.
Figure 5B:
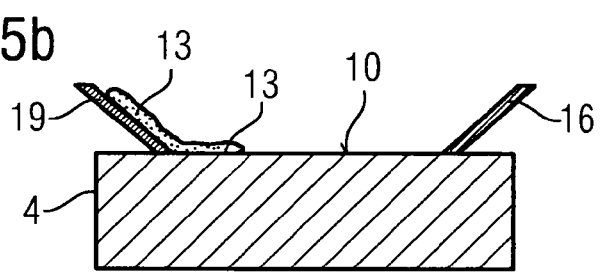

The method then continues by applying the auxiliary welding material 13 onto or into the site 10 to be repaired (FIG. 5b).

Figure 5C:
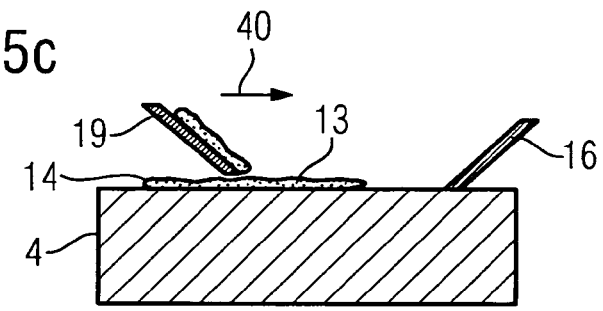

The precursor plate 19 may be displaced, although it does not have to be, so that it also lies over a previously welded region 14. This has the advantage that already welded regions 14 are no longer contaminated, for example by a vapor cloud from the region 13 currently to be welded (FIG. 5c).

Instead of displacing the precursor plate 19, a further shielding plate (not shown) may also be used and displaced.

Figure 5D:
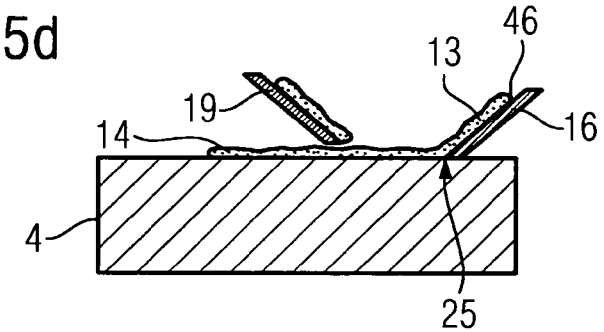

The welding method is carried out as far as the cavity end point 25, and then preferably continuous over a follower plate 16 until a method end point 46 is reached (FIG. 5d).

Figure 5E:
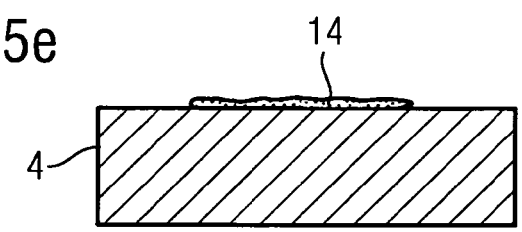

The precursor plates 16, 19 are removed, so that the fully repaired component 1 is then provided (FIG. 5e).

Figure 6:
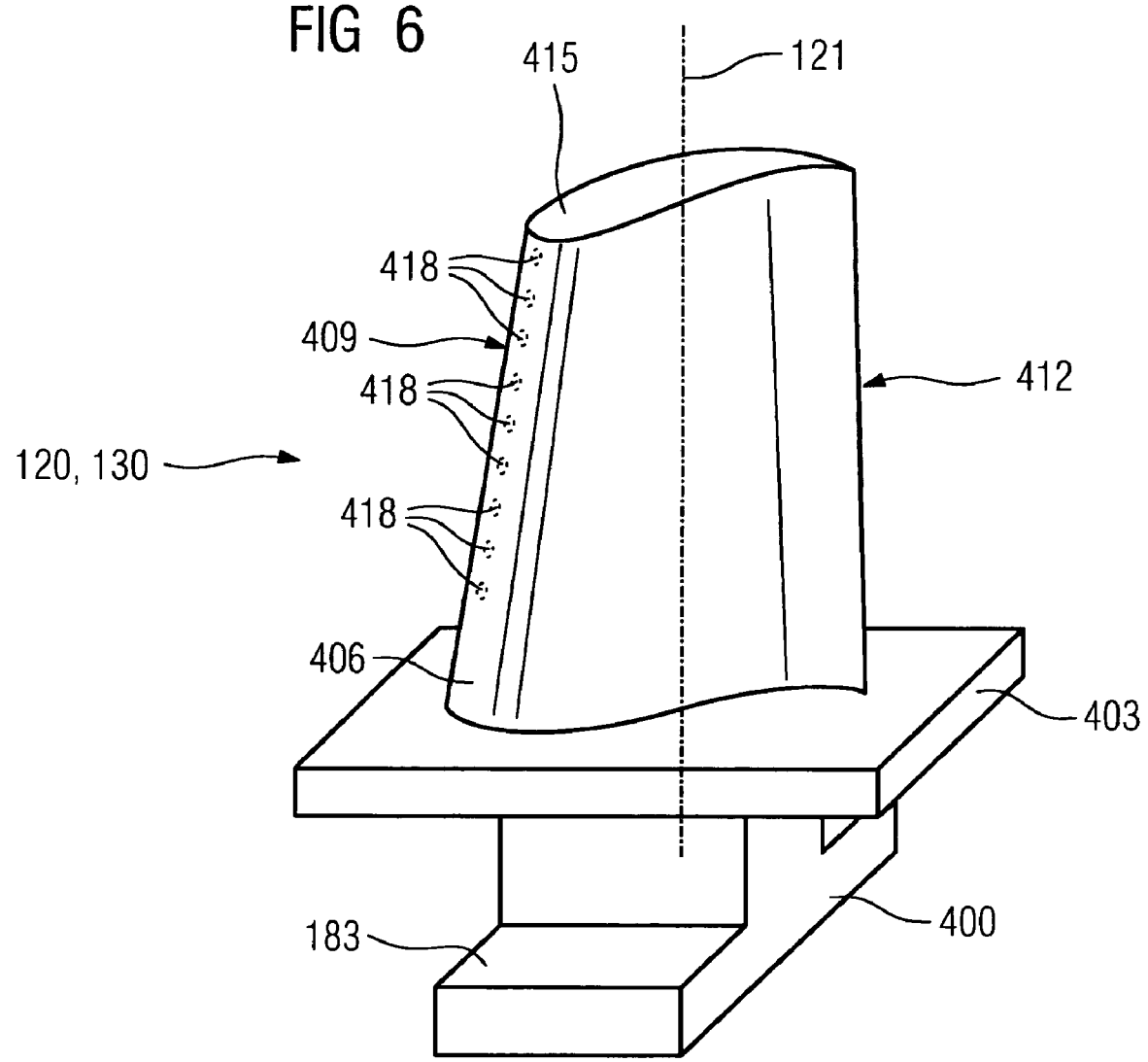
FIG. 6 shows a perspective view of a turbine blade.

FIG. 6 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

Successively along the longitudinal axis 121, the blade 120, 130 comprises a fastening zone 400, a blade platform 403 adjacent thereto as well as a blade surface 406.

As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a fir tree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130.

Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation.

Such monocrystalline workpieces are manufactured, for example, by directional solidification from the melts. These are casting methods in which the liquid metal alloy is solidified to form a monocrystalline structure, i.e. to form the monocrystalline workpiece, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; these documents are part of the disclosure.

The blades 120, 130 may likewise have coatings against corrosion or oxidation, for example (MCrAlX; M is at least one element from the group iron (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX layer, there may furthermore be a thermal insulation layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal insulation layer by suitable coating methods, for example electron beam deposition (EB-PVD), or for example atmospheric plasma spraying (APS) produces porous grains affected by microcracks and macrocracks in the thermal insulation layer.

Refurbishment means that components 120, 130 may need to have protective layers taken off (for example by sandblasting) after their use. Then the corrosion and/or oxidation layers or products are removed. Optionally, cracks in the component 120, 130 are also repaired by the method according to the invention. The component 120, 130 is then recoated and the component 120, 130 is used again.

The blade 120, 130 may be designed to be a hollow or solid. If the blade 120, 130 is intended to be cooled, it will be hollow and optionally also comprise film cooling holes 418 (indicated by dashes).

Figure 7:
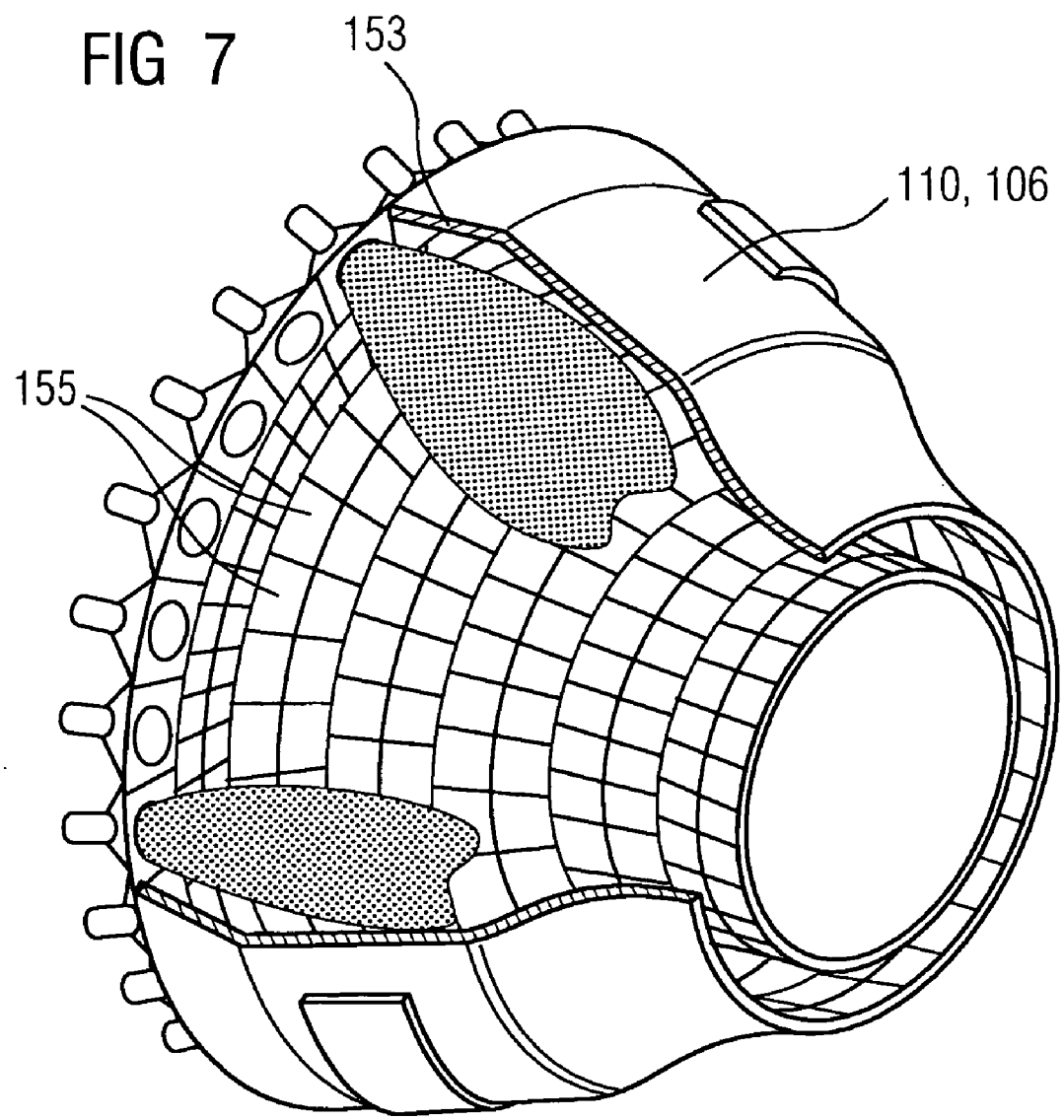
FIG. 7 shows a perspective view of a combustion chamber.
Figure 8:
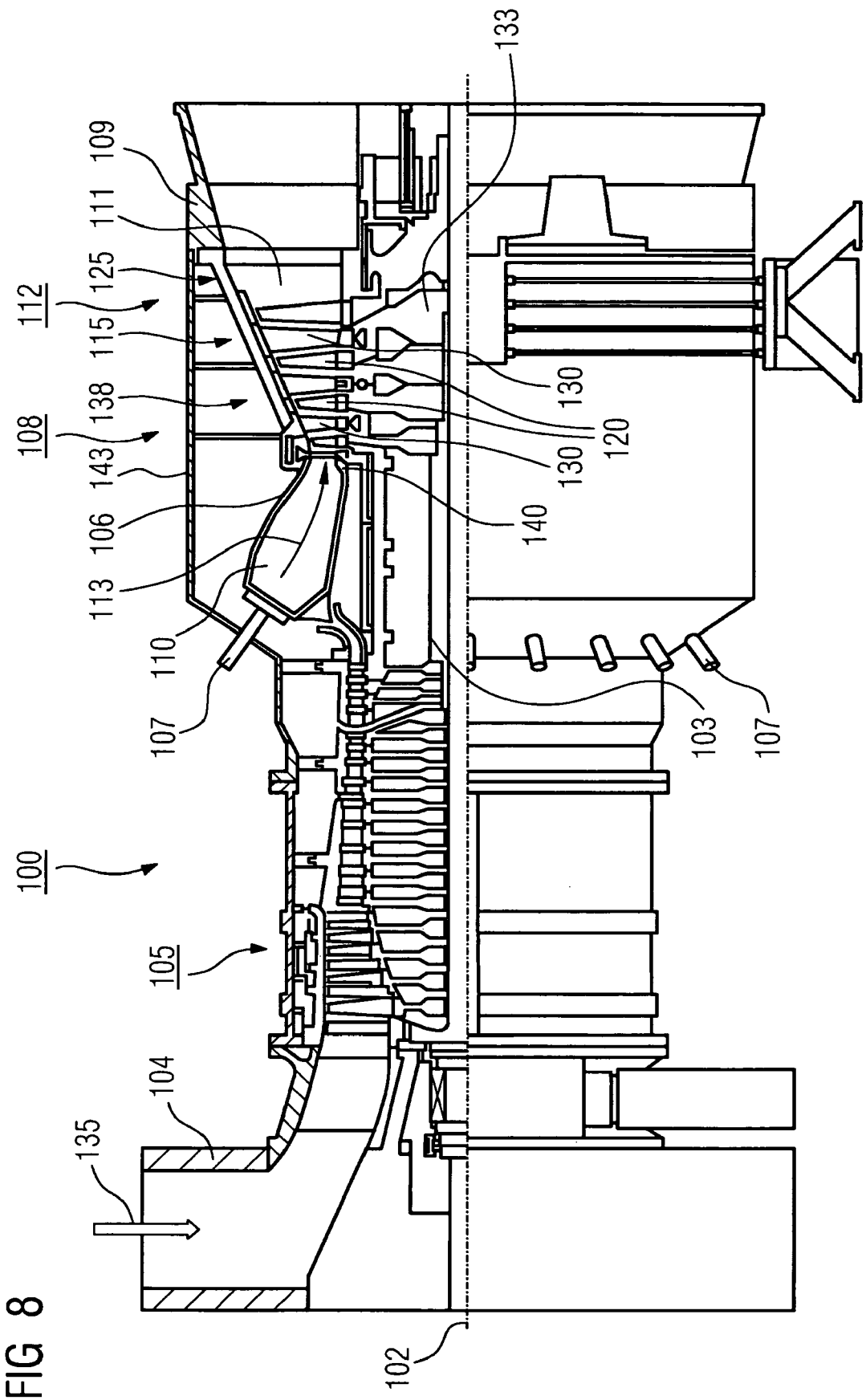
FIG. 8 shows a perspective view of a gas turbine.

FIG. 7 shows a combustion chamber 110 of a gas turbine 100 (FIG. 8).

The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 made of an alloy is equipped with a particularly heat-resistant protective layer (MCrAlX layer and/or ceramic coating) on the working medium side, or is made of refractory material (solid ceramic blocks).

These protective layers may be similar to the turbine blades, i.e. for example MCrAlX means: M is at least one element from the group iron (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX, there may also be an e.g. ceramic thermal insulation layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal insulation layer by suitable coating methods, for example electron beam deposition (EB-PVD).

Refurbishment means that heat shield elements 155 may need to have protective layers taken off (for example by sandblasting) after their use. The corrosion and/or oxidation layers or products are then removed. Optionally, cracks in the heat shield element 155 are also repaired by the method according to the invention. The heat shield elements 155 are then recoated and the heat shield elements 155 are used again.

Owing to the high temperatures inside the combustion chamber 110, a cooling system may also be provided for the heat shield elements 155 or for their retaining elements. The heat shield elements 155 are then hollow, for example, and optionally also have film-cooling holes (not shown) opening into the combustion chamber space 154.

FIG. 8 shows a gas turbine 100 by way of example in a partial longitudinal section.

The gas turbine 100 internally comprises a rotor 103, which will also be referred to as the turbine rotor, mounted so as to rotate about a rotation axis 102 and having a shaft 101.

Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fastened on the rotor 103, for example by means of a turbine disk 133. Coupled to the rotor 103, there is a generator or a work engine (not shown).

During operation of the gas turbine 100, air 135 is taken in and compressed by the compressor 105 through the intake manifold 104. The compressed air provided at the turbine-side end of the compressor 105 is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat-shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed grains (DS, structure).

Iron-, nickel- or cobalt-based superalloys are for example used as material for the components, in particular for the turbine blades 120, 130 and components of the combustion chamber 110.

Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The guide vanes 130 comprise a guide vane root (not shown here) facing the inner housing 138 of the turbine 108, and a guide vane head lying opposite the guide vane root. The guide vane head faces the rotor 103 and is fixed on a fastening ring 140 of the stator 143.

The invention claimed is:

1. A welding method, comprising:
providing a component having a site to be repaired wherein the site to be repaired comprises a start point and an end point; and
supplying a welding material to the site to be repaired wherein welding is initiated at a method start point on a separate precursor plate that rests on the start point, wherein the welding material is supplied constantly in the form of a powder during welding or introduced into the site in the form of a wire or strip.

2. The method as claimed in claim 1, wherein a separate follower plate is used that rests on the end point where the welding method ends at a method end point.

3. The method as claimed in claim 2, wherein the precursor plate is displaced in a welding direction during the method, and thereby shields already welded regions.

4. The method as claimed in claim 1, wherein a cavity is filled.

5. The method as claimed in claim 4, wherein the cavity is a crack.

6. A welding device for welding a component, comprising:
a heat source for melting a welding material;
a powder reservoir that stores the welding material;
a powder feed that transports the welding material from the powder reservoir; and
a separate precursor plate, on which the welding material is supplied and melted,
wherein a separate follower plate is provided, on which the welding material is also provided.

7. The welding device as claimed in claim 6, wherein the precursor plate is displaced in a welding direction during the welding method.

8. The welding device as claimed in claim 6,
wherein the precursor plate and/or the follower plate forms an acute angle with respect to an edge of an upper surface of the component, and
wherein the precursor plate and/or the follower plate rests on the edge of the upper surface of the component.

9. The welding device as claimed in claim 8, wherein a contact edge of the precursor plate and/or the follower plate with the edge of the upper surface conforms to a curvature of the edge of the upper surface of the component.

* * * * *